United States Patent
Engel et al.

(10) Patent No.: US 11,814,001 B2
(45) Date of Patent: Nov. 14, 2023

(54) KNEE AIRBAG, KNEE AIRBAG MODULE AND STEERING ASSEMBLY

(71) Applicant: Autoliv Development AB, Vargarda (SE)

(72) Inventors: Andreas Engel, Dachau (DE); Ralf Zauritz, Holzkirchen (DE); Florian Hanke, Röhrmoss (DE)

(73) Assignee: Autoliv Development AB, Vargarda (SE)

( * ) Notice: Subject to any disclaimer, the term of this patent is extended or adjusted under 35 U.S.C. 154(b) by 39 days.

(21) Appl. No.: 17/596,865

(22) PCT Filed: May 12, 2020

(86) PCT No.: PCT/EP2020/063168
§ 371 (c)(1),
(2) Date: Dec. 20, 2021

(87) PCT Pub. No.: WO2020/259910
PCT Pub. Date: Dec. 30, 2020

(65) Prior Publication Data
US 2022/0306035 A1    Sep. 29, 2022

(30) Foreign Application Priority Data
Jun. 26, 2019    (DE) ..................... 10 2019 117 216.0

(51) Int. Cl.
*B60R 21/206*    (2011.01)
*B60R 21/231*    (2011.01)
*B60R 21/00*    (2006.01)

(52) U.S. Cl.
CPC .......... *B60R 21/206* (2013.01); *B60R 21/231* (2013.01); *B60R 2021/0051* (2013.01); *B60R 2021/23169* (2013.01)

(58) Field of Classification Search
CPC ... B60R 21/206; B60R 21/231; B60R 21/203; B60R 21/205; B60R 2021/23169; B60R 2021/0051
(Continued)

(56) References Cited

U.S. PATENT DOCUMENTS 7,549,671 B2   6/2009   Mizuno et al.
7,604,252 B2   10/2009   Heitplatz et al.
(Continued)

FOREIGN PATENT DOCUMENTS

CN    104 742 849 B    8/2017
DE    102006051218 A1 *   11/2007  .......... B60R 21/206
(Continued)

*Primary Examiner* — Keith J Frisby
(74) *Attorney, Agent, or Firm* — Foley & Lardner LLP

(57) ABSTRACT

A knee airbag having a first wall extending from an upper end and having a first outer surface serving as an impact surface being positioned opposite the knee-shin-area of an occupant to be protected when the airbag is fully deployed, and a second wall extending from a rear end adjacent or identical to the upper end of the first wall and having a second outer surface. The second wall comprises a first section, a second section and a groove section being positioned between the first section and the second section such that the second outer surface shows a groove. In order to make the knee airbag suitable for a vehicle that does not provide sufficient instrument panel surface to support it, the first wall and the first and second sections of the second wall enclose an angle between 20° and 80°, preferably between 30° and 60°.

18 Claims, 5 Drawing Sheets

Figure 1:
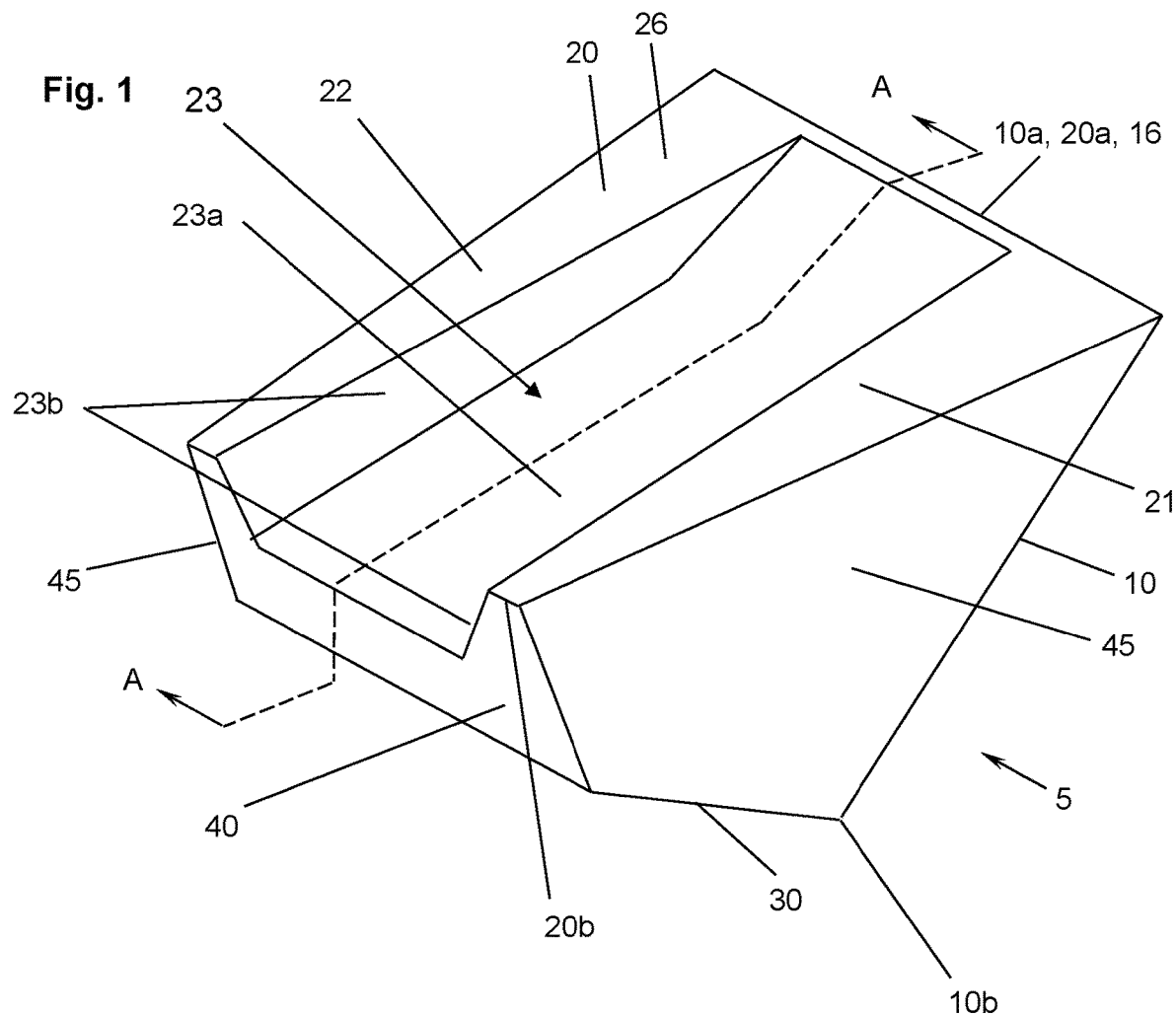

(58) Field of Classification Search
USPC .......................... 280/730.1, 731, 743.1, 732
See application file for complete search history.

(56) References Cited

U.S. PATENT DOCUMENTS

| | | | |
|---|---|---|---|
| 7,896,386 B2* | 3/2011 | Fukawatase | B60R 21/2346 |
| | | | 280/732 |
| 9,902,359 B2* | 2/2018 | Takeshita | B60R 21/2338 |
| 2007/0246920 A1* | 10/2007 | Abele | B60R 21/206 |
| | | | 280/743.2 |
| 2008/0106078 A1 | 5/2008 | Fukawatase et al. | |
| 2011/0175334 A1* | 7/2011 | Miller | B60R 21/239 |
| | | | 280/736 |
| 2017/0072890 A1* | 3/2017 | Jindal | B60R 21/203 |
| 2020/0276953 A1* | 9/2020 | Enders | B60R 21/206 |

FOREIGN PATENT DOCUMENTS

| | | | | |
|---|---|---|---|---|
| EP | 1531098 A1 * | 5/2005 | ........... | B60R 21/233 |
| GB | 2263671 A * | 8/1993 | ........... | B60R 21/206 |
| JP | 2005186887 A * | 7/2005 | | |
| JP | 2008 114703 A | 5/2008 | | |
| JP | 2009083617 A * | 4/2009 | ........... | B60R 21/206 |
| KR | 20100035858 A * | 1/2010 | ........... | B60R 21/233 |

* cited by examiner

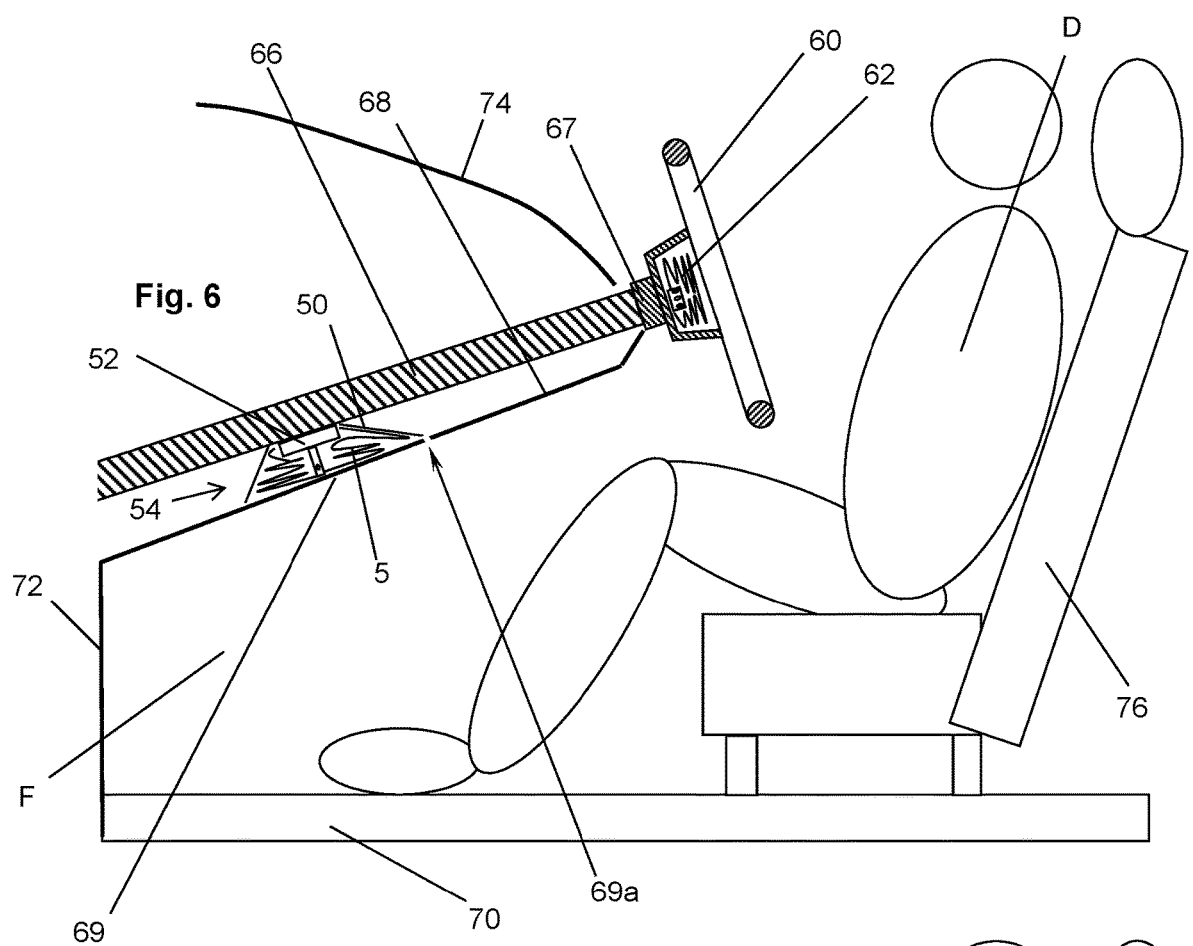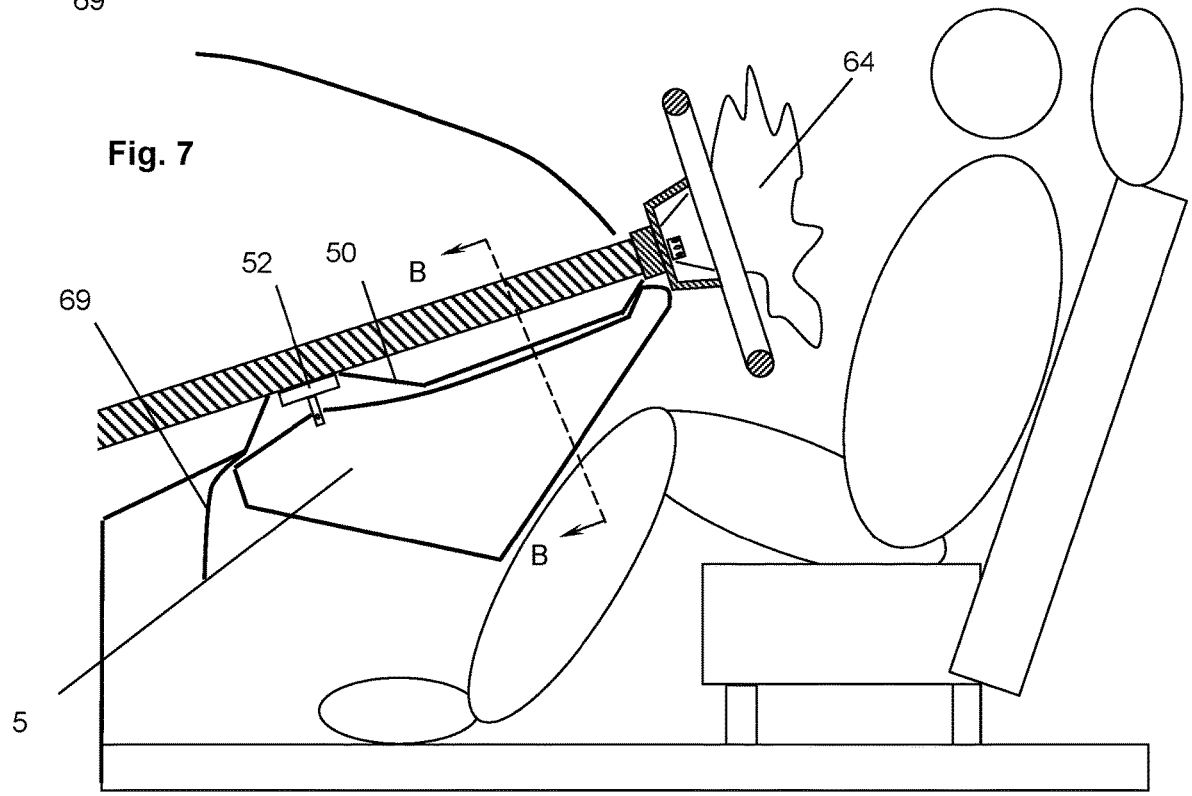

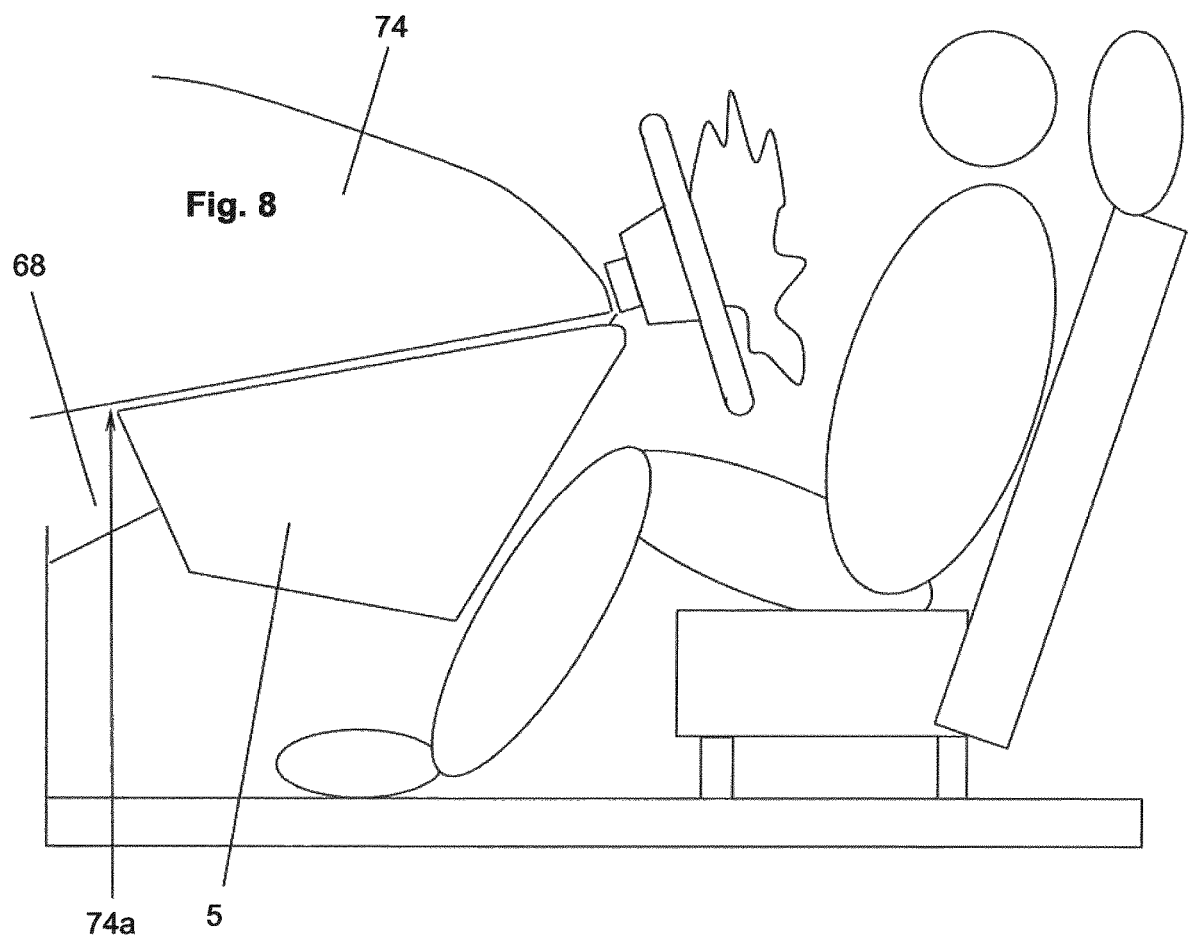

KNEE AIRBAG, KNEE AIRBAG MODULE AND STEERING ASSEMBLY

The invention relates to a knee airbag, a knee airbag module, and a steering assembly, according to embodiments discussed herein.

The use of knee airbags is widespread in today's automotive technology. Such knee airbags are used to protect the driver as well as the front seated passenger. A knee airbag has principally two main objects, namely to protect the knee-shin area from hitting a rigid part of the vehicle and to help in keeping the driver/passenger in a defined position, especially if he or she is not belted.

As almost every airbag, a knee airbag has an impact surface facing the body part of the person to be protected and a support surface usually facing a part of the vehicle. The impact surface is the outer surface of a first wall or a section of the same and the support surface is the outer surface of a second wall or a section of the same.

A passenger knee airbag deploys from a housing being located in the instrument panel and the support surface is supported by a lower part of the instrument panel.

The driver knee airbag usually also deploys from a housing being located in the instrument panel. This housing is often located under a carrying structure of the steering assembly. This structure usually comprises the steering column. At least a lower part of this carrying structure is usually covered by a lower part of the instrument panel. As in the case of passenger knee airbags, the driver knee airbag is supported by the instrument panel.

Most of today's knee airbags are so-called 2D airbags comprising only a first wall and a second wall extending basically parallel to each other.

For example from prior art documents CN 104742849 B, JP 2008-114703, U.S. Pat. Nos. 7,549,671 B2, and 7,604,252 B2 it is known to provide a knee airbag which shows a recess through which a part of the steering assembly (namely a section of the cladding covering the carrying structure of the steering wheel) extends.

Newer concepts suggest designing cars such that the instrument panel does not have a lower section. So, at least a large part of the carrying structure of the steering assembly is located outside the instrument panel and is covered by a cladding such that the cladding of the steering assembly is basically "standing alone". According to the definitions chosen here, this cladding is not a part of the instrument panel although the instrument panel and this cladding could be made as a one-pieced plastic part.

It is the object of the invention to provide a knee airbag that is suitable for a vehicle that does not provide sufficient instrument panel surface to support it.

This task is solved by embodiments discussed herein.

As every knee airbag, the inventive knee airbag comprises a first wall extending from an upper end to a lower end and having a first outer surface serving as an impact surface being positioned opposite the knee-shin-area of the driver when the airbag is fully deployed, and a second wall extending from a rear end adjacent or identical to the upper end of the first wall to a front end and having a second outer surface. The outer surface of this second wall or at least a part of it serves as the support surface. This second wall comprises a first section, a second section and a groove section being positioned between the first section and the second section such that the second outer surface shows a groove for the cladding of the steering assembly. In order to adapt the knee airbag to the new geometry, the first wall and the first and second sections of the second wall enclose an acute angle between 20° and 80°, preferably between 30° and 60°. So, unlike in traditional knee airbags, the impact surface and the support surface are not parallel to each other and the knee airbag is preferably wedge-shaped.

The groove section substantially extends around the cladding of the steering assembly, so the steering assembly itself supports the knee airbag at least to a substantial extent.

In order to even better conform to the new geometry, it can be preferred that the groove has a non-uniform depth, especially such that its depth decreases from the front end to the rear end of the knee airbag. Additionally, the width of the groove can decrease towards the rear end of the second wall.

Because of the wedge-shape, the volume of the completely deployed knee airbag according to the invention usually exceeds the volume of a traditional knee airbag and it is preferred that the knee airbag encloses a volume of at least 55 litres.

The knee airbag extends preferably along the complete cladding of the steering assembly.

Figure 2:
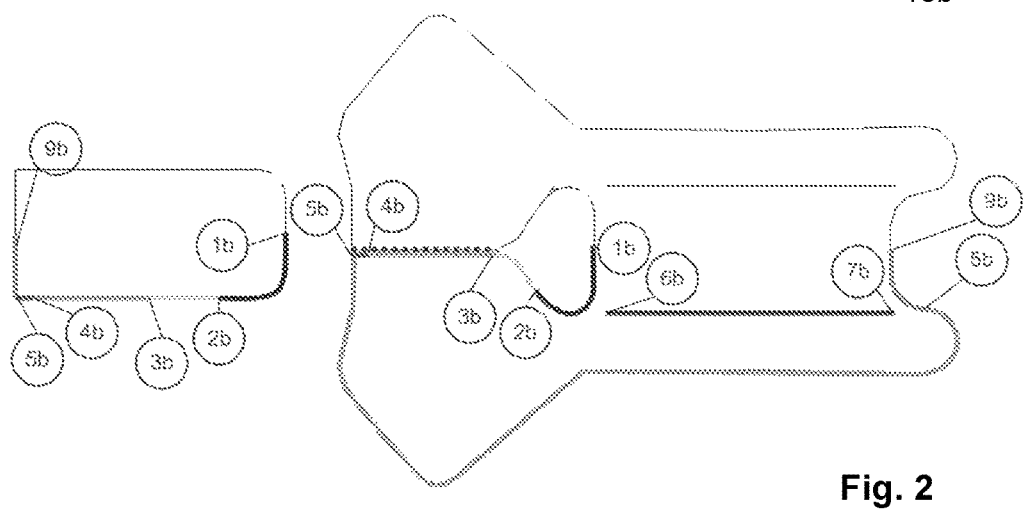
Figure 3:
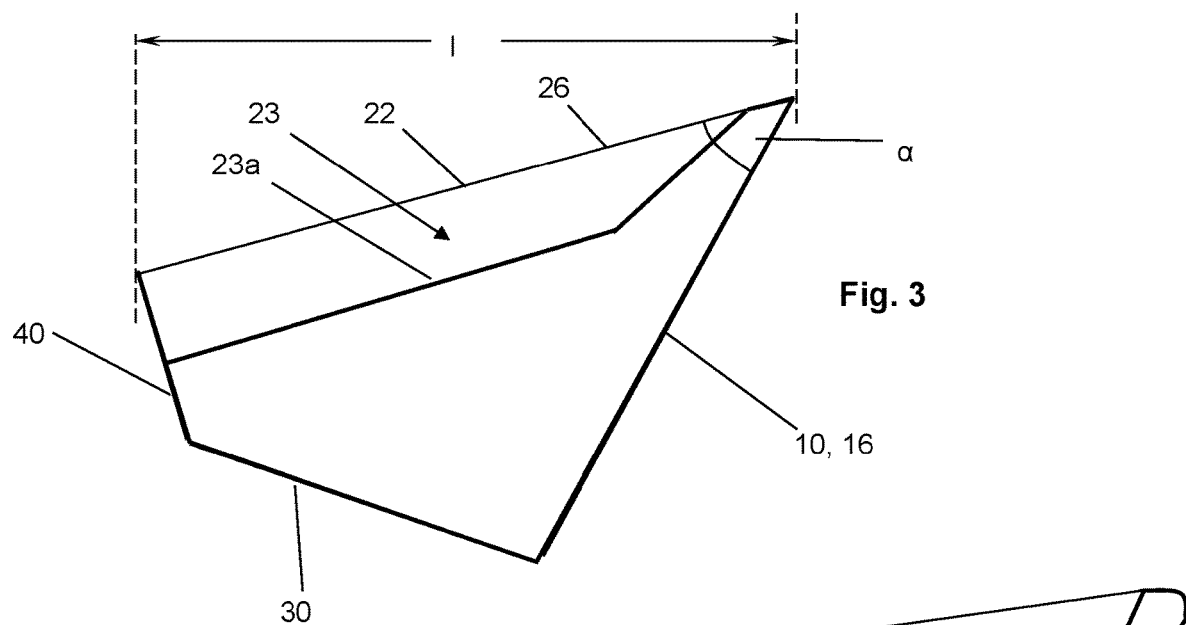
Figure 4:
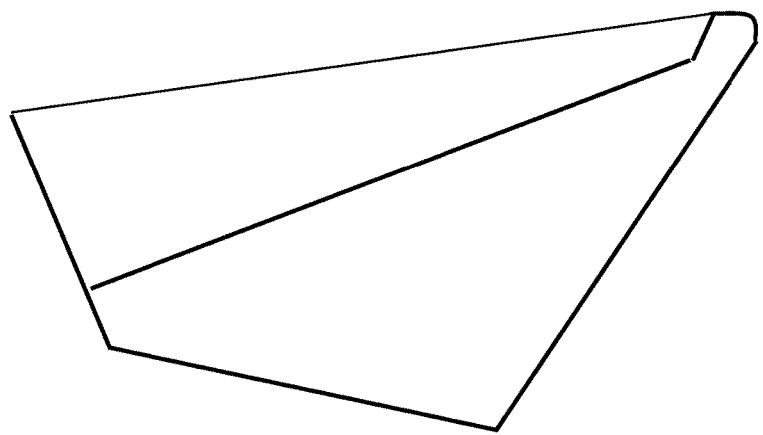
Figure 5:
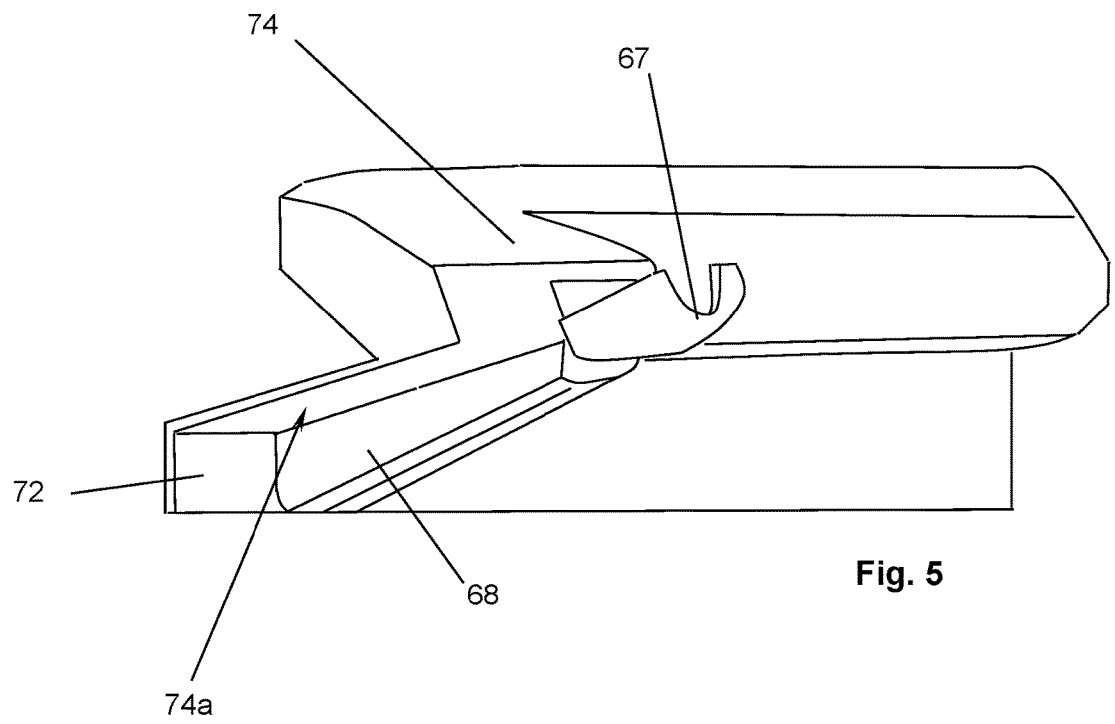
Figure 9:
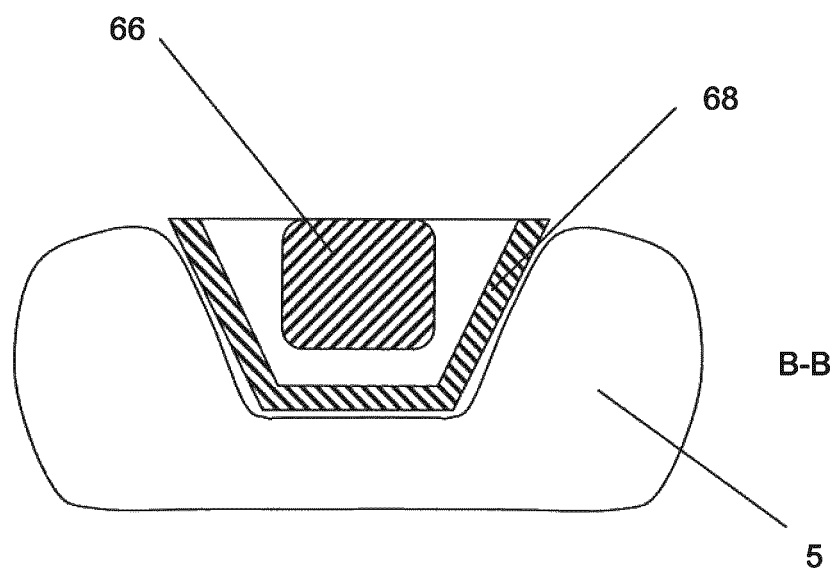
Figure 10:
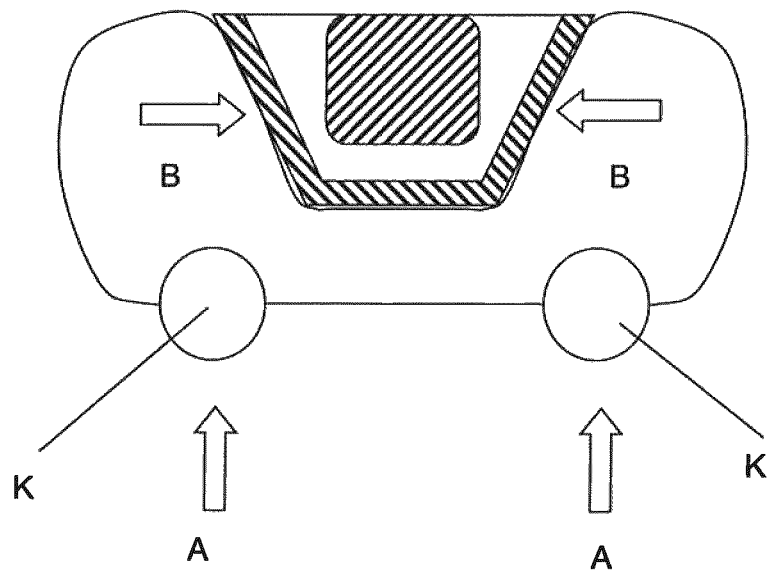

The invention will now be described by means of preferred embodiments in view of the figures. The figures show:

FIG. 1 a schematic 3-dimensional representation of a first embodiment of the inventive knee airbag, FIG. 2 two cuttings from which a knee airbag shown in FIG. 1 can be sewn, FIG. 3 a sectional view taken along line A-A in FIG. 1, FIG. 4 a knee airbag with a slightly different shape in a representation according to FIG. 3, FIG. 5 a schematic 3-dimensional representation of an instrument panel and a not yet finished steering assembly, FIG. 6 a schematic sectional view through a front part of a motor vehicle, whose instrument panel is shown in FIG. 5, FIG. 7 what is shown in FIG. 6 after a frontal crash has occurred, FIG. 8 what is shown in FIG. 7 in a schematic side view, FIG. 9 a schematic sectional view taken along plane B-B in FIG. 7, and FIG. 10 what is shown in FIG. 10 after the knees and shins of the driver hit the impact surface of the knee airbag.

In order to better understand the invention, reference is first made to FIG. 5 which shows a part of an instrument panel of the passenger car and a part of a steering assembly which is located under the instrument panel 74. Relevant for the invention is that the instrument panel 74 ends at a lower wall having a surface 74*a* pointing downwards. In the embodiment shown, the surface 74*a* basically defines a plane. This plane is slightly inclined against the horizontal plane. From the car forward end of the instrument panel 74 a panel forming a frontal end of the foot well extends. This part is often referred to as the fire wall 72. One can also see parts of the steering assembly, namely a connecting piece 67 to which a steering wheel can be connected, and a cladding 68 which covers a carrying structure which carries the connecting piece 67. Usually a steering column extends through this carrying structure. One can see in FIG. 5 that the cladding 68 starts at the fire wall and extends from the surface 74*a* to a large amount. This makes the use of traditional knee airbags impossible.

FIGS. 1 and 3 show a knee airbag 5 which is adapted for being used in a car as shown in FIG. 5. This knee airbag 5 can be a part of a knee airbag module being located behind the cladding 68. The geometry of this airbag 5 will now be described:

As one can easily see from FIGS. 1 and 3, the airbag 5 is basically wedge-shaped with a first wall 10, a second wall 20, a third wall 30, a fourth wall 40 and two side walls 45. The third wall 30 and the fourth wall 40 could also be formed as a joined wall or could be looked at as being sections of a joined wall. The first wall 10 extends from an upper end 10a to a lower end 10b and forms the impact wall such that the outer surface of the first wall 10, and thus a first outer surface 16 of the knee airbag 5, faces the knee-shin area of the driver when the airbag is deployed during an accident. The second wall 20 extends from a rear end 20a to a front end 20b. The rear end 20a of the second wall 20 also forms the upper end 10a of the first wall 10 or is adjacent to it. In the shown embodiment these two ends are identical. The second wall 20 is comprised of a first section 21, a second section 22 and a groove section 23 located between the first section and the second section. This means that the outer surface of the second wall 20, and a second outer surface 26 of the knee airbag 5, shows a groove. This groove extends from the front end of the knee airbag 5 to its rear end 20a or close to its rear end. The groove section 23 can be looked at as having a bottom 23a and two sides 23b. The first wall 10 basically defines a first plane and the first section 21 and the second section 22 of the second wall basically define a second plane. Of course it is to be noted that a "real life" deployed airbag does not show geometrically exact plane surfaces.

As has been mentioned, the knee airbag 5 is wedge-shaped which means that the angle α between the first plane and the second plane (see especially FIG. 3) is smaller than 180 degrees (meaning that the two planes would be parallel as is usually the case with traditional knee airbags which are very often sewn from two basically congruent cuttings). This angle α is an acute angle and is preferably between 20® and 80°, especially between 30° and 60°. The total length l of the knee airbag is usually between 30 cm and 90 cm, preferably between 50 and 60 cm.

As one can see from FIG. 1, the depth and the width of the groove decrease from the front end to the rear end of the knee airbag 5. The groove basically conforms to the section of the cladding 68 to be covered by the knee airbag. An opening for a gas generator can be provided in the bottom 23a of the groove section 23 but this is not shown in FIG. 1.

As can be seen from FIG. 2, a knee airbag having a shape as just described can be sewn from two cuttings. A first cutting basically forms the groove section of the second wall and the second section forms all the other walls. The seams to be applied are indicated by the numbers in FIG. 2.

FIG. 6 shows a schematic cross section through the front part of a passenger car on the driver side. The instrument panel 74 and the firewall 72 have a geometry as shown in FIG. 5. A steering wheel 60 having a frontal airbag module 62 is mounted to a connecting piece 67. One can also see the carrying structure 66 carrying this connecting piece 67 and thus the steering wheel 60. As mentioned, the steering column (if the car has one) runs through this carrying structure 66 and the structure 66 is covered by a cladding 68. A knee airbag module 54 comprising the knee airbag 5 shown in FIG. 4, a housing 50 and a gas generator 52 is located between the carrying structures 66 and the cladding 68. The part of the cladding 68 being located in front of this airbag module 62 forms a door 69 which is separated from the remaining cladding 68 by means of a breaking line 69a. The exit opening of the housing 50 is facing the floor 70 of the vehicle.

FIG. 7 shows what is shown in FIG. 6 after a frontal crash has been detected by the sensor system of the vehicle.

The knee airbag 5 needs to be deployed very quickly in order to be positioned between the vehicle and the knee-shin area of the driver D before the driver substantially starts to move towards the front of the vehicle. So, usually the knee airbag 5 is fully deployed before the frontal airbag 64 of the frontal airbag module 62 if fully deployed. This is shown in FIG. 8. As will be described later in more detail, the rear end of the cladding 68 of the steering assembly is substantially completely surrounded by the knee airbag 5 meaning that this part of the cladding 68 is located in the groove of the knee airbag 5.

FIG. 8 shows what is shown in FIG. 7 but in a view from the side instead of a sectional view. Here one can see more clearly that the knee airbag 5 surrounds the cladding 68 of the steering assembly and that the first section 21 and the second section 22 of the second wall 20 are adjacent to or abutting the lower surface 74a of the instrument panel 74. The first wall and thus its impact surface are located close and preferably basically parallel to the knee-shin area of the driver D.

FIG. 9 shows a sectional view taken along line B-B in FIG. 7. Here one can see how the cladding 68 is surrounded by the knee airbag 5 meaning that it is accommodated in its groove.

FIG. 10 shows the situation after the knee-shin areas K of the driver hit the impact surface being formed of the outer surface of the first wall 10. The knee-shin areas K intrude into the first wall (arrows 10). Because of these forces, the sides 23b of the groove section 23 are pressed towards to the sides of the cladding 68 and of course the bottom 23a of the groove section 23 is pressed against the front side of the cladding 68. So, a sort of a clamping movement occurs that is sufficient to support the knee airbag 5 on the cladding 68 of the steering assembly. In case that the lower surface 74a of the instrument panel is close enough, this surface additionally supports the knee airbag 5, but it needs to mention that the "clamping around" the cladding of the steering assembly would be enough to support the knee airbag 5.

As one can see from the above, a new kind of knee airbag for the driver is provided which does not need to rely on the support of an instrument panel such that it can be used for vehicle geometries which do not have a lower instrument panel section.

LIST OF REFERENCE NUMBERS 5 knee airbag
10 first wall
10a upper end
16 first outer surface
20 second wall
20a rear end
21 first section
22 second section
23 groove section
23a bottom
23b side
26 second outer surface
30 third wall
40 fourth wall
50 housing
52 gas generator
60 steering wheel
62 frontal airbag module
64 frontal airbag
66 carrying structure
67 connecting piece
68 cladding
69 door
69a breaking line 70 floor
72 front end of foot well
74 instrument panel
76 seat
F foot well
D driver

The invention claimed is:

1. A knee airbag, comprising:
a first wall extending from an upper end and having a first outer surface serving as an impact surface configured to protect a knee-shin-area of an occupant when the airbag is fully deployed,
a second wall extending from a rear end adjacent or identical to the upper end of the first wall and having a second outer surface, said second wall comprising a first section, a second section and a groove section being positioned between the first section and the second section such that the second outer surface shows a groove, wherein the depth of the groove decreases towards the rear end of the second wall,
wherein the first wall and the first and second sections of the second wall enclose an angle between 20° and 80°.

2. The knee airbag according to claim 1, wherein the first wall basically defines a first plane.

3. The knee airbag according to claim 1, wherein the first section and the second section of the second wall basically define a second plane.

4. The knee airbag according to claim 1, wherein the knee airbag is basically wedge-shaped.

5. The knee airbag according to claim 1, wherein the width of the groove decreases towards the rear end of the second wall.

6. The knee airbag according to claim 1, wherein the knee airbag encloses a volume of at least 40 litres.

7. The knee airbag according to claim 1, wherein the knee airbag has a length of at least 45 cm.

8. A knee airbag module comprising the knee airbag recited in claim 1 and a gas generator.

9. A steering assembly comprising a steering wheel, a carrier, a cladding covering the carrier towards a foot well and the knee airbag module according to claim 8, the knee airbag module being located between the carrier and the cladding.

10. A knee airbag, comprising:
a first wall extending from an upper end and having a first outer surface serving as an impact surface configured to protect a knee-shin-area of an occupant when the airbag is fully deployed,
a second wall extending from a rear end adjacent or identical to the upper end of the first wall and having a second outer surface, said second wall comprising a first section, a second section and a groove section being positioned between the first section and the second section such that the second outer surface shows a groove, wherein the width of the groove decreases towards the rear end of the second wall,
wherein the first wall and the first and second sections of the second wall enclose an angle between 20° and 80°.

11. The knee airbag according to claim 10, wherein the first wall basically defines a first plane.

12. The knee airbag according to claim 10, wherein the first section and the second section of the second wall basically define a second plane.

13. The knee airbag according to claim 10, wherein the knee airbag is basically wedge-shaped.

14. The knee airbag according to claim 10, wherein the groove has a non-uniform depth.

15. The knee airbag according to claim 10, wherein the knee airbag encloses a volume of at least 40 litres.

16. The knee airbag according to claim 10, wherein the knee airbag has a length of at least 45 cm.

17. A knee airbag module comprising the knee airbag recited in claim 10 and a gas generator.

18. A steering assembly comprising a steering wheel, a carrier, a cladding covering the carrier towards a foot well and the knee airbag module according to claim 17, the knee airbag module being located between the carrier and the cladding.

* * * * *